United States Patent [19]

Himwich et al.

[11] Patent Number: 5,235,597
[45] Date of Patent: Aug. 10, 1993

[54] SYNCHRONIZING ASYNCHRONOUS PROTOCOL INTERACTIONS BETWEEN PEER LAYERS IN DIFFERENT NODES OF A LAYERED COMMUNICATION NETWORK

[75] Inventors: Harold A. Himwich; Joseph R. Mason; Thomas P. McSweeney, all of Raleigh; Robert A. Vrabel, Apex; Loretta S. Wolhar, Chapel Hill, all of N.C.

[73] Assignee: International Business Machines Corp., Armonk, N.Y.

[21] Appl. No.: 667,618

[22] Filed: Mar. 8, 1991

[51] Int. Cl.⁵ .................. H04J 3/12; H04L 12/56
[52] U.S. Cl. ......................... 370/110.1; 370/94.1
[58] Field of Search ............... 370/110.1, 94.1, 91, 370/100.1, 105.1, 119, 60, 94.3, 94.2; 371/33, 11.3, 12; 375/107, 109

[56] References Cited

U.S. PATENT DOCUMENTS

| | | | |
|---|---|---|---|
| 4,908,823 | 3/1990 | Haagens et al. | 370/91 |
| 4,991,133 | 2/1991 | Davis et al. | 370/94.1 |
| 5,007,051 | 4/1991 | Dolkas et al. | 370/110.1 |
| 5,027,343 | 6/1991 | Chan et al. | 370/60 |
| 5,115,432 | 5/1992 | Haas | 370/94.1 |

*Primary Examiner*—Douglas W. Olms
*Assistant Examiner*—Hassan Kizou
*Attorney, Agent, or Firm*—Jerry W. Herndon

[57] ABSTRACT

A method and apparatus for allowing the higher layers of two nodes on a connection that uses an asynchronous link protocol to synchronize the exchange of messages so that, without knowledge of the lower data link protocols, the protocols at higher layers can complete when the data link protocols are also complete. The upper layer of a node sends messages for transmittal to another node to the lower layer of its node and receives messages from another node via the lower layer of its node. A first message, including an initiator flag is sent from the upper layer of the first node to the lower layer of the first node. In response, the lower layer transmits a second message including the initiator flag from the first message to the lower layer of the second node. The second message is transmitted as a command or a response in accordance with the send process state of the lower layer of the first node. If the upper layer of the first node subsequently detects a fourth message from the lower layer of the first node (which corresponds to a third message from the second node) and if the initiator flag is ON in the fourth message, the primary or secondary status of the first node is determined. If the first node is primary, the first message is resent to the lower layer of the first node until a message is received having the initiator flag set to OFF. The initiator flag is set to ON in all subsequent messages to the lower layer of the first node related to the first message. If the first node is secondary, the fourth message is discarded and the initiator flag in all subsequent messages to the lower layer of the first node related to the first message are set to OFF.

8 Claims, 8 Drawing Sheets

SYNCHRONIZING ASYNCHRONOUS PROTOCOL INTERACTIONS BETWEEN PEER LAYERS IN DIFFERENT NODES OF A LAYERED COMMUNICATION NETWORK

TECHNICAL FIELD

The invention relates to the field of data communications in general and to enhancements of layered protocol architectures, such as the Open System Interconnection (OSI) standard, for communication between data processing or end nodes and between layers within a node. In particular the invention relates to a method and means for synchronizing the asynchronous protocol interactions between peer layers in different nodes of a layered communication network.

BACKGROUND OF THE INVENTION

Many communication architectures follow a layered model in which the lowest layer deals with physical transmission media and progressively higher layers perform higher level communication services until, at a selected intermediate or the highest layer, communication with some final process or user is achieved. At a processing node, the layered approach isolates the functions performed in one layer from the details of operation required to perform the functions of the lower layers. Between data processing nodes, functions at the same layers are considered to be peer functions that interact with each other during communication using the layered protocols. At a single node, processes in one layer obtain services from processes in the adjacent lower layer.

A problem that can arise between nodes and between layers within a node is the synchronization of the protocols that occur between the peer layers. Such problems can occur in some circumstances precisely because of the intentional isolation built-in between the layers of a node in the layered environment. For example, conflicting protocol operations might be initiated substantially at the same time by peer upper layers of two communicating nodes. These initiated operations set in motion other protocol operations between peer lower layers of the same nodes. The lower layers may be able to recognize and resolve the resulting conflicting operations at their layer. However, because of the logical isolation between a lower layer and an upper layer in one node, the upper layers may not be able to recognize and easily resolve their corresponding operations.

One example of the above problem can occur in the context of a nonactivation XID (Exchange Identification) exchange between two nodes. A nonactivation XID message is a message that is used within SNA (System Network Architecture) to change the operating parameters of a link between two nodes after the link has been initially established. For example, a nonactivation XID can be used to change the type of network services that are delivered over a link from those initially requested when the link was established, or to change the logical identification of the link. The nonactivation XID allows link parameters such as these to be dynamically changed without requiring that the link be disconnected and completely reestablished. FIG. 1 shows one illustrative example of the problem. The nonactivation XID messages are initiated by processes in the network layer in response to certain system stimuli and are sent by the network layer to the data link control (DLC) layer for delivery to the other node. To completely understand the problem, it is understood that the DLC layers are executing independent processes for sending messages and receiving messages. The essentials for these state machines are shown in FIGS. 9 and 10, respectively. These state machines follow the rules set forth for the IEEE 802.2 protocol as specified in the publication AN AMERICAN NATIONAL STANDARD; IEEE STANDARDS FOR LOCAL AREA NETWORKS; LOGICAL LINK CONTROL (ANSI/IEEE 802.2-1985; ISO DRAFT INTERNATIONAL STANDARD 8802/2). Essentially, a DLC has a send message state machine (FIG. 9) and a receive message state machine (FIG. 10). In the send process, a DLC in the SEND COMMAND state sends a command marked as such to another DLC and enters a WAITING RESPONSE state. It stays in the WAITING RESPONSE state until it receives a response from the other node or until it times out, at which time it returns to the SEND COMMAND state. Independently of this send process, a DLC receive process initially starts in a WAITING COMMAND state. When it receives a command from another DLC, it enters a RESPONSE state in which the next message it sends to another DLC is sent and marked as a response. It then returns to the WAITING COMMAND state. The independence of these DLC state machines, as will be seen, as well as other factors, causes the difficulties solved herein.

Returning to FIG. 1, node A is in communication with node B via a physical link 100. It is assumed that this link has been established at some prior time by appropriate protocol message flows. At 102 and 104, a separate event in each node simultaneously triggers the network layer in the corresponding node to send a nonactivation XID message to the other node. The network layers have no concept of command and response that is present in the DLC layers. They merely tell their lower data link control (DLC) layer to transmit the message over the link 100 to the other node, thereby beginning a sequence of operations to change the link in some manner. However, the protocol executed at the DLC layer proceeds according to command and response. That is, when a DLC sends a message marked as a command to another DLC, it expects a message from the other DLC marked as a response. Because neither DLC at 102 and 104 owe the other DLC any response at this point, both nodes transmit the messages as commands. This is illustrated by the box C (for command) shown at 106 and 108. These DLC layers pass these messages to their respective network layers at 110 and 112. Each of the network layers may continue to send nonactivation XIDs to the other node as long as required to satisfy the protocol requirements of the network layer. For this discussion, it is assumed that only one such message is required. Therefore, after the messages are sent as commands by the DLC at 106 and 108, each of the DLCs then expects to receive a response to the command. Since the protocol exchange is satisfied as far as the network layers are concerned, no stimulus is given by either network layer to its DLC to perform any other transmission. Therefore, no messages that are treated as responses are transmitted. The protocols between the layers of each node are now out of synchronization. Eventually, the DLC layers timeout waiting for their expected responses. It is assumed that node A times out first at 114 and retransmits its earlier nonactivation XID. This message initiates a brand new round of events in the DLC and network layers of node B. Eventually Node B times out waiting for its response at 116 and retransmits its earlier nonactivation XID message as well. Exactly how and when this nonsynchronization is resolved by both nodes and the layers within the nodes is unpredictable.

A common solution to the above problem in the known art is the use of sequence numbering in the link messages. With the use of such sequence numbers, a layer is able to determine what responses correspond with which commands, whether a given message is a retransmission of a previous one, and the like. And with such information, a protocol is able to avoid the above problem. However, some protocols do not permit the use of sequence numbers, e.g., XID messages do not. This problem arises primarily in such protocol systems.

SUMMARY OF THE INVENTION

This invention contemplates a method and means for carrying out the method of allowing the higher layers of two nodes on a connection that uses an asynchronous link protocol, e.g., both nodes can send commands and responses independently, to synchronize the exchange of messages so that, without knowledge of the lower data link protocols, the protocols at higher layers can complete when the data link protocols are also complete. Examples of such asynchronous link protocols include the Asynchronous Balanced Mode (ABM) on IBM Token Rings.

In accordance with the invention, the system provides for communication services between first and second nodes that are connected by a link. The services are provided by a layered communication architecture within each node including at least a lower layer and an upper layer. The upper layer of a node sends messages for transmittal to another node to the lower layer of its node and receives messages from another node via the lower layer of its node. Also, each lower layer contains independent processes for sending and receiving messages to another node, the sending process sending a message as a command and then waiting for a response and the receiving process waiting for a command and then sending its next message as a response. A first message is sent from the upper layer of the first node to the lower layer of the first node. The first message includes an initiator flag set to an ON state. In response to the first message by the lower layer of the first node, the lower layer transmits a second message including the initiator flag from the first message to the lower layer of the second node. The second message is transmitted as a command or a response in accordance with the send process state of the lower layer of the first node. If the upper layer of the first node subsequently detects the receipt of a fourth message from the lower layer of the first node (which corresponds to a third message from the second node) and if the initiator flag is ON in the fourth message, the primary or secondary status of the first node is determined. If the first node is primary, the first message is resent to the lower layer of the first node until a message is received having the initiator flag set to OFF. The initiator flag is set to ON in all subsequent messages to the lower layer of the first node related to the first message. If the first node is secondary, the fourth message is discarded and the initiator flag in all subsequent messages to the lower layer of the first node related to the first message are set to OFF. The upper layer process in the second node carries on a similar process. The result is that the protocol going on at the higher layers of the two nodes resolve in synchronization with the protocol going on at the lower layers.

DETAILED DESCRIPTION

In conformity with the earlier example of the problem solved by this invention, we describe a detailed implementation of the invention using the nonactivation XID situation. However, it should be understood that the invention is not so limited. Indeed, the problem may occur between any layers of a layered communication architecture and in situations other than nonactivation XID exchanges or the like.

Figure 1:
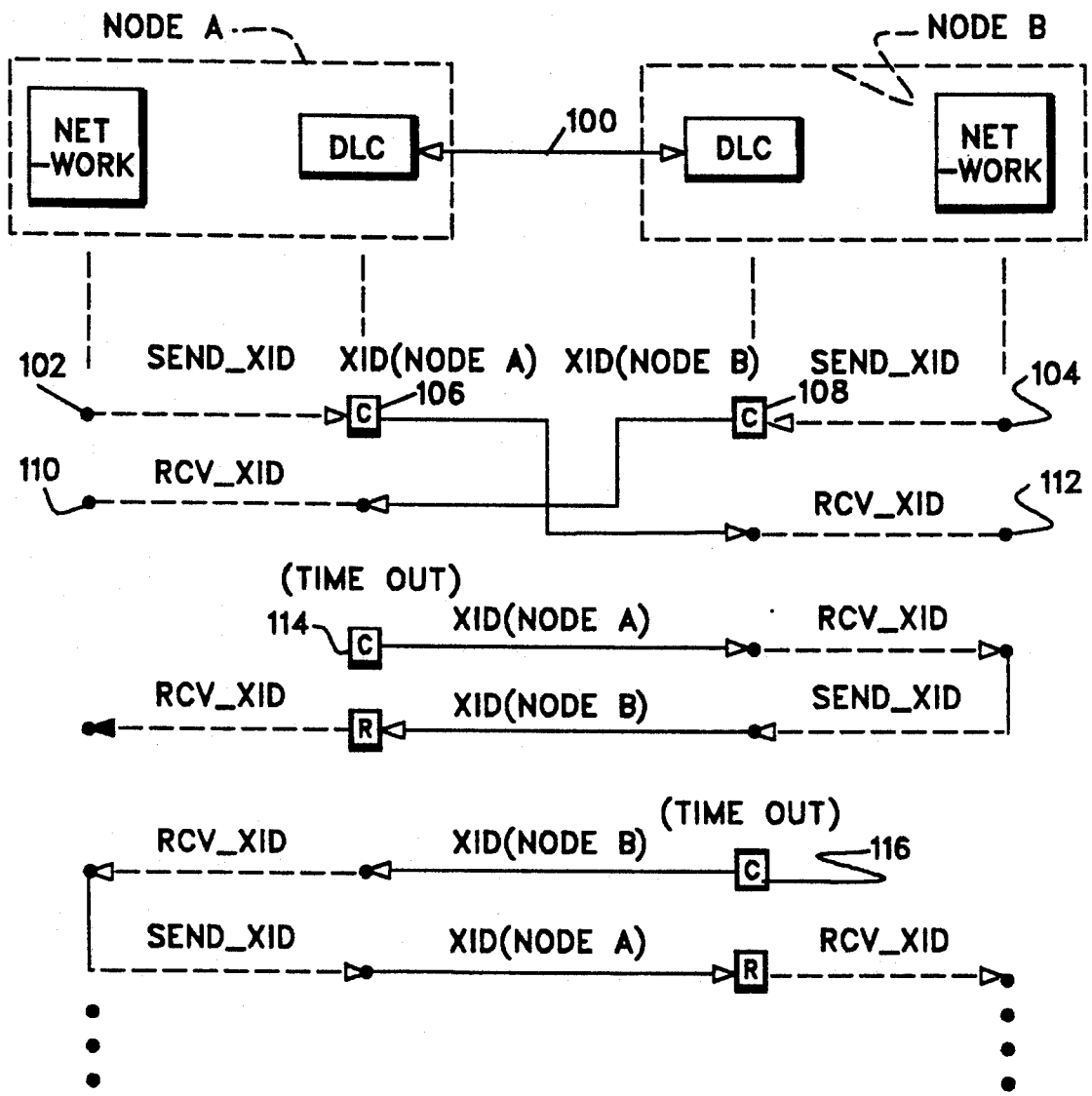
FIG. 1 shows a message flow diagram involving a nonactivation XID message exchange sequence that illustrates the protocol nonsynchronization problem between nodes that is solved by the invention.
Figure 2:
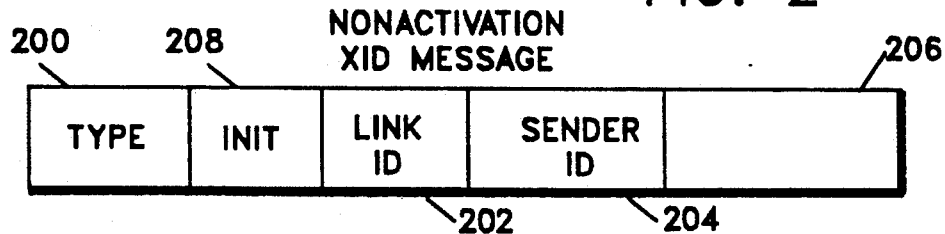
FIG. 2 shows an illustrative format of the layout of a nonactivation XID message.
Figure 3:
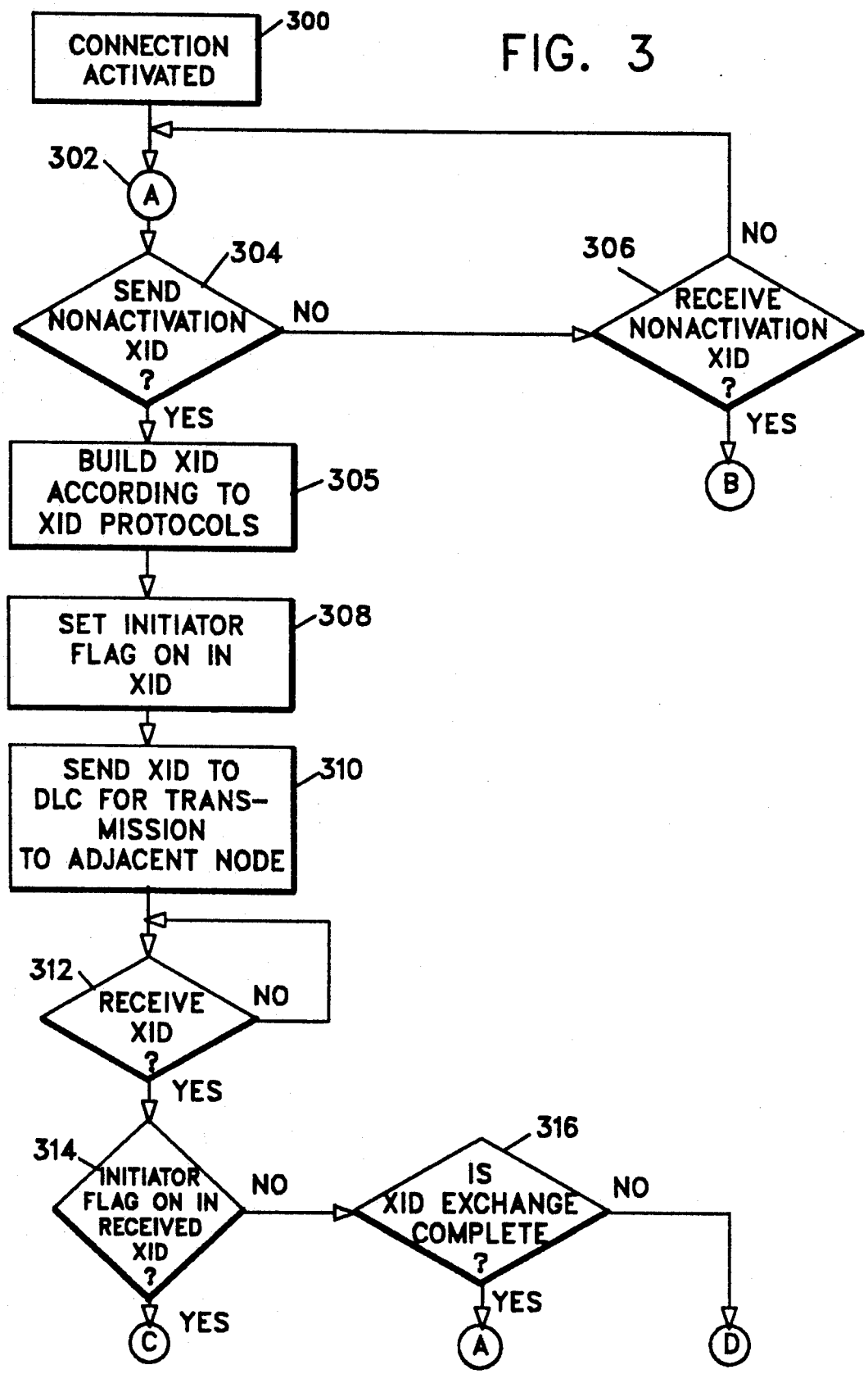
FIGS. 3 through 6 show illustrative flowcharts of the method steps executed at an upper layer of the communication architecture of a node that solves the nonsynchronization problem.

FIG. 2 shows an illustrative layout of a nonactivation XID message. As shown, a nonactivation XID message has a TYPE field 200 which identifies the message as such. A LINK ID field 202 contains an identifier of the link over which the message is transmitted to a node. This ID corresponds to link 100 in FIG. 1. A SENDER ID field 204 contains the identity of the node sending a message. This might correspond to the node identity A in FIG. 1. Other fields (not shown) and not relevant to the invention are aggregately shown as field 206 in FIG. 2. Finally, in accordance with the invention, the nonactivation XID message now contains a field 208 called INIT (for initiator). The INIT field is used to help resolve any protocol synchronization problem as exemplified earlier in this discussion. This will become clear below. For now, suffice it to say that whenever a network layer entity first initiates a nonactivation XID message, the INIT field in the message is set to so indicate that this is an initiator node. Later, in the face of an attempt by both nodes to initiate a nonactivation XID exchange, this field may be set to reflect a nonirritating state by one of two communicating nodes. And the state of this field in messages received by a network layer is used according to protocol rules to be discussed to resolve the synchronization problems.

FIGS. 3 through 6 show the steps executed by the network layer of a node to process nonactivation XID messages in accordance with the invention. These steps can be performed by software loaded into the main memory of a general or special purpose computer that controls a node, by firmware in a node configured to perform the functions of a layer or layers, by hardware sequencers, or in any other way desired within a system. In the preferred embodiment, the steps are executed by software in a main memory. Step 300 in FIG. 3 conceptually indicates that a link between two nodes of interest has already been priorly established. Thereafter, beginning at A (302), the layer continually looks for conditions which require the generation of a nonactivation XID (step 304) or the receipt of a nonactivation XID from the other node which will require action. If step 304 detects that transmission of a nonactivation XID is needed at any given time, step 305 generates an appropriate XID message, and step 308 sets the INIT field to ON to indicate that this node is acting as an initiator. Step 310 sends the nonactivation XID message to the DLC layer of its node where it is transmitted to the other node to which it is linked. Since the initiating node expects a reply XID to this message, step 312 waits until the reply is received by the DLC and passed up to the network layer. Generally, if all goes well, the network layer in the node generating the reply XID message sets its INIT field to OFF to indicate that the message is a reply. It should be noted that the initiate/reply states from the network layers point of view does not determine the command/response state of a DLC layer. Step 314 determines if the INIT field is set to OFF in this reply message. In the normal case, it will be. In this case, step 316 determines from the network layer point of view if the XID protocol exchange between the two nodes is complete and returns to address A (302) if this is the case. The nodes and layers have not lost synchronization so far.

Figure 4:
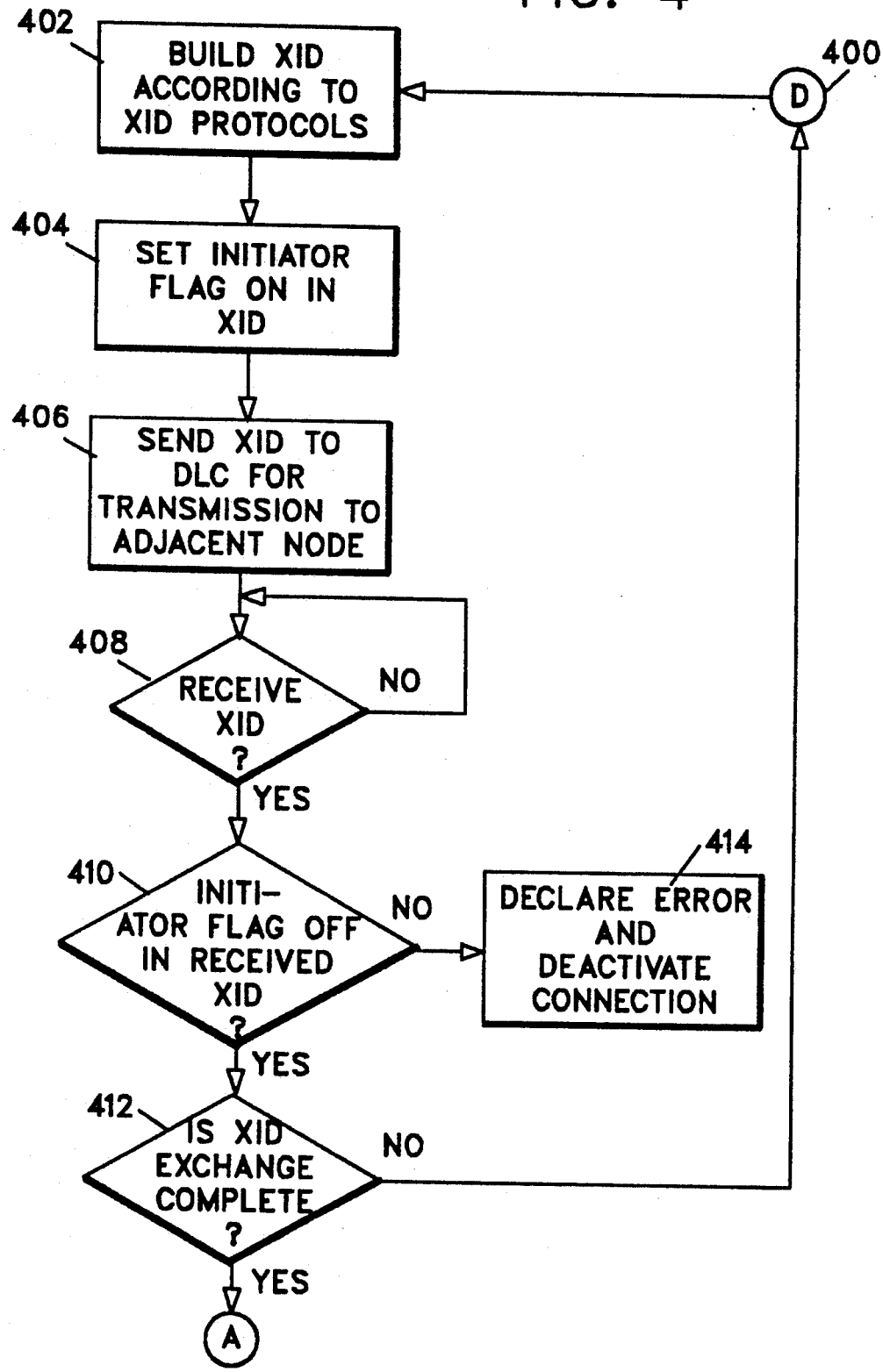
Figure 5:
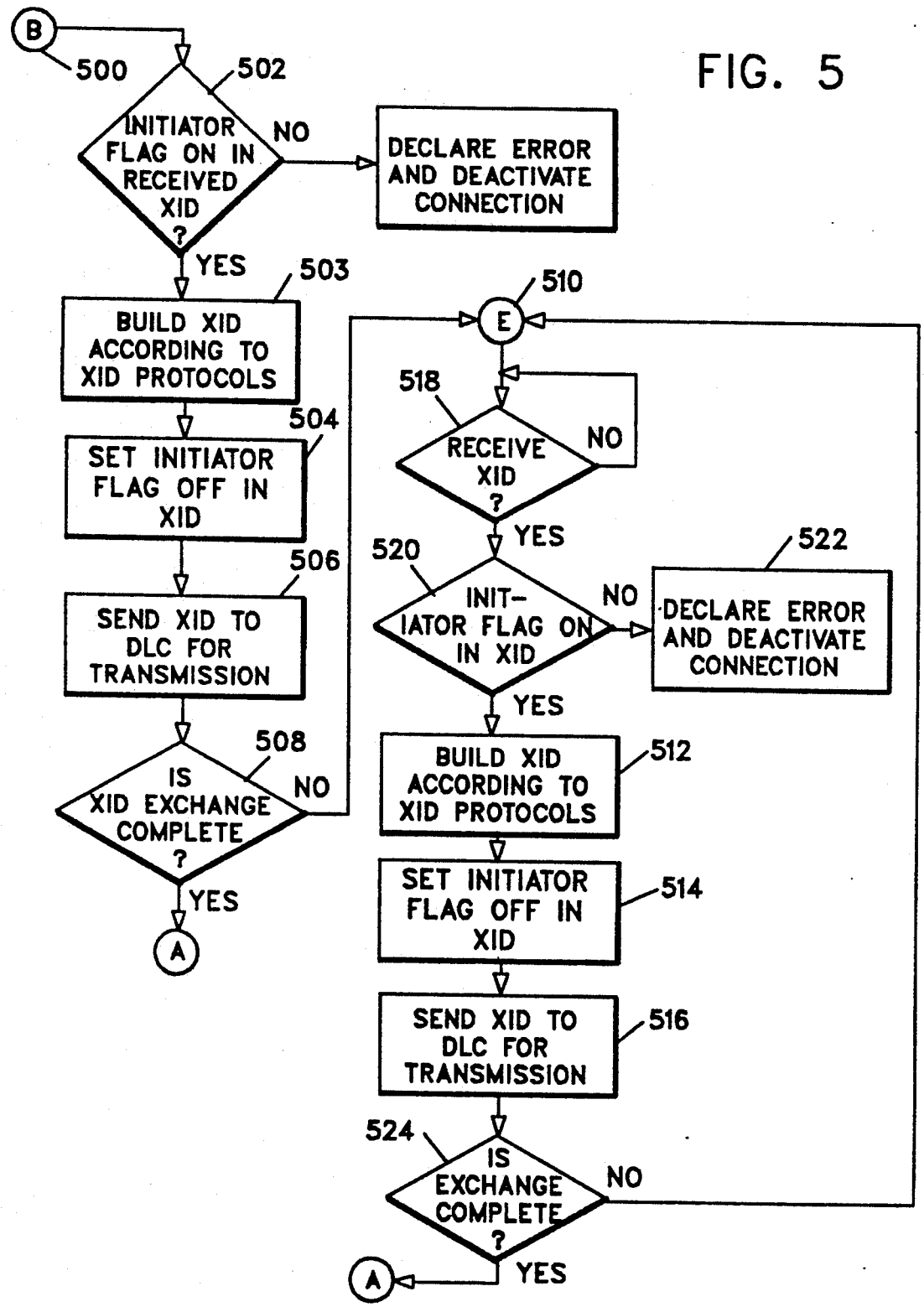

Execution continues at address D (400) in FIG. 4 if step 316 determines that the XID exchange is not complete. Step 402 builds the next nonactivation XID message. Step 404 sets the INIT field to ON because this node is still the initiator of the XID exchange sequence. Steps 406 and 408 transmit the message via the DLC of this node and wait for a reply message from the other node. When the reply is received, step 410 determines if the INIT field therein is properly set to OFF. If so, and the XID exchange is complete, step 412 returns to address A (302) to wait the next XID stimulus, if any. If the present exchange is not yet complete, step 412 continues at address D (400) to generate the next XID message. If step 410 determines at any time during these XID exchanges that a reply message from the other node has the INIT field set therein to ON, then an error condition is declared at 414 and the link connection to the other node is disconnected. The error condition is assumed to exist because the two nodes were in synchronization when address D was first called and should remain so until the end of the XID exchange sequence.

The above represents the normal sequence of events that occur when a node initiates an XID sequence and no problems occur. Returning to step 314, if it is determined that the INIT field is ON in a reply from the other node, this means that there is a race condition between the two nodes. Both have initiated independent XID messages. Execution continues at address C (600) in FIG. 6. The nodes are now out of synchronization. The problem is to restore the synchronization. Step 602 determines if the instant node is considered to be the primary node (whereas the other node is the secondary). This determination can be done in many ways. In some embodiments, the primary/secondary relationship of two nodes is negotiated and remembered by both when a link between them is first established. However, this relationship can be established in any deterministic way so long as the rules for so determining are established when the link is activated. For example, since node names are unique, numerical ordering of the names can be used also to establish the primary/secondary relationship.

Assuming that the instant node is primary at step 602, step 604 resends the initial XID to the other node. Step 606 waits for a reply to the resent XID. Step 608 determines if the INIT field in the reply message is OFF, as it should be. If it is not, the loop consisting of steps 604, 606 and 608 is repeated until a resent XID message to the other node results in a proper reply marked as such. This insures that the two nodes synchronize before continuing at step 610. Step 610 merely determines if the XID exchange sequence is complete from the network layer's point of view, as described earlier. If it is, execution begins again at A in FIG. 3. If not execution continues at D (FIG. 4) as already described.

For the above to reestablish synchronization between the two nodes, it is necessary that the secondary node also take action. Thus, as shown at step 612, if the instant node is the secondary node, it discards the just received nonactivation XID message and waits at step 614 for another XID message to arrive from the primary node. In the worst case, absent a link or node failure, the primary node will timeout waiting for a reply to its last nonactivation XID message and will resend it. This timeout is not shown except in the flow diagram of FIG. 1 for simplicity. When the resent XID from the primary node is received at step 614, its INIT field should be set on indicating that synchronization is achieved. If it is not (step 616), an error condition is declared at step 618 and the link is disconnected. Otherwise, execution continues at address E, as already described.

Program address B (FIG. 5) is executed from step 306 when the instant node receives a nonactivation XID message from the other node. The INIT field of this message should be set on, since the instant node has not initiated a nonactivation XID message for which a reply is expected. Therefore, at step 502, if this is not the case, an error condition is declared and the link is disconnected. If the INIT field is on, step 503 generates a reply XID; 504 sets the INIT field of this message to off. Step 506 sends the message to the DLC layer for transmission to the other node. Step 508 determines if the XID exchange sequence is complete from the point of view of the network layer. If so, execution begins again at address A in FIG. 3. Otherwise, execution continues at address E (510). The steps 518, 520, 522, 512, 514, 516, and 524 perform exactly the same functions as the steps of address D, except 514 sets the INIT field to off in reply XID messages generated for the other node.

Figure 6:
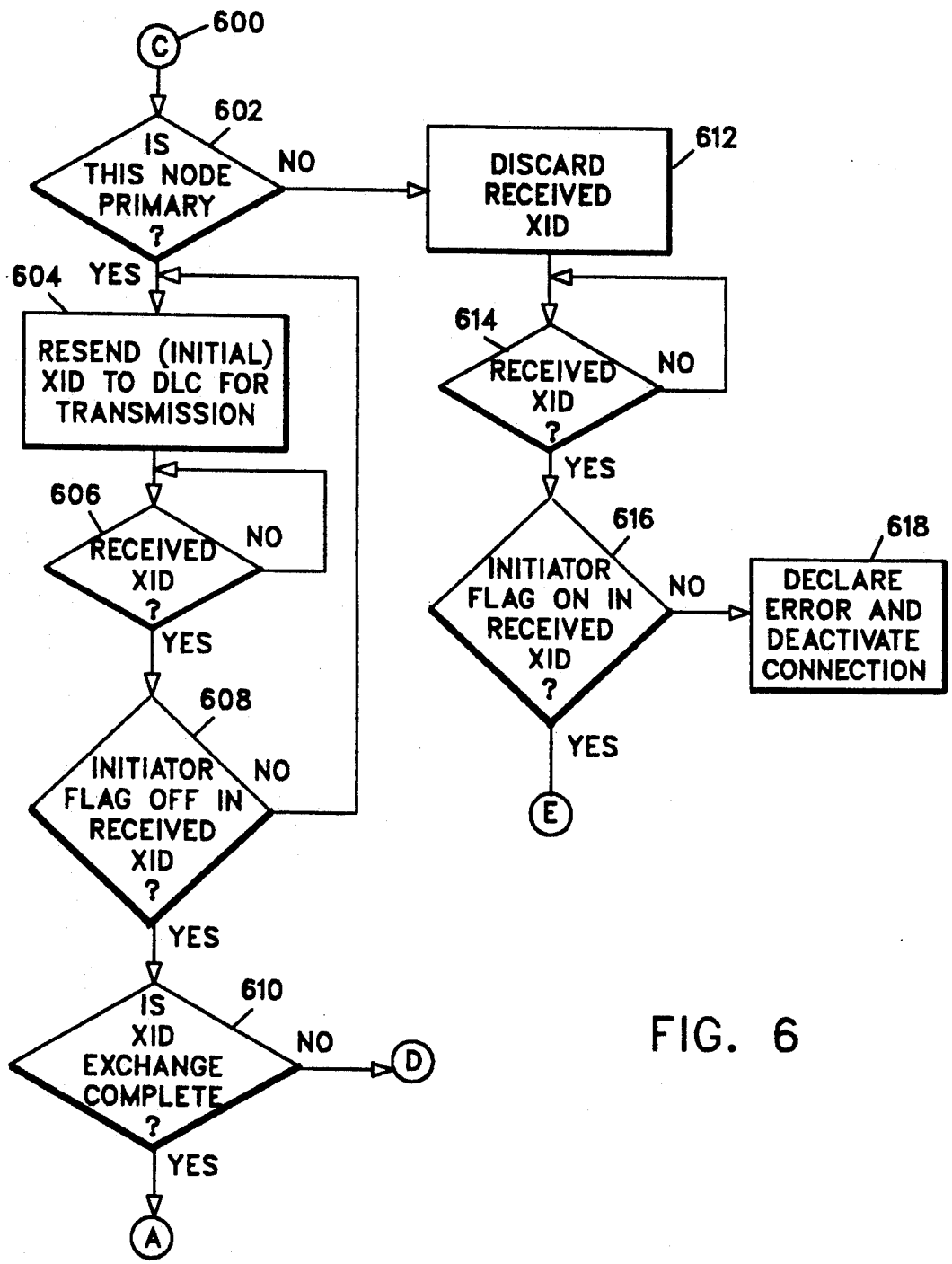
Figure 7:
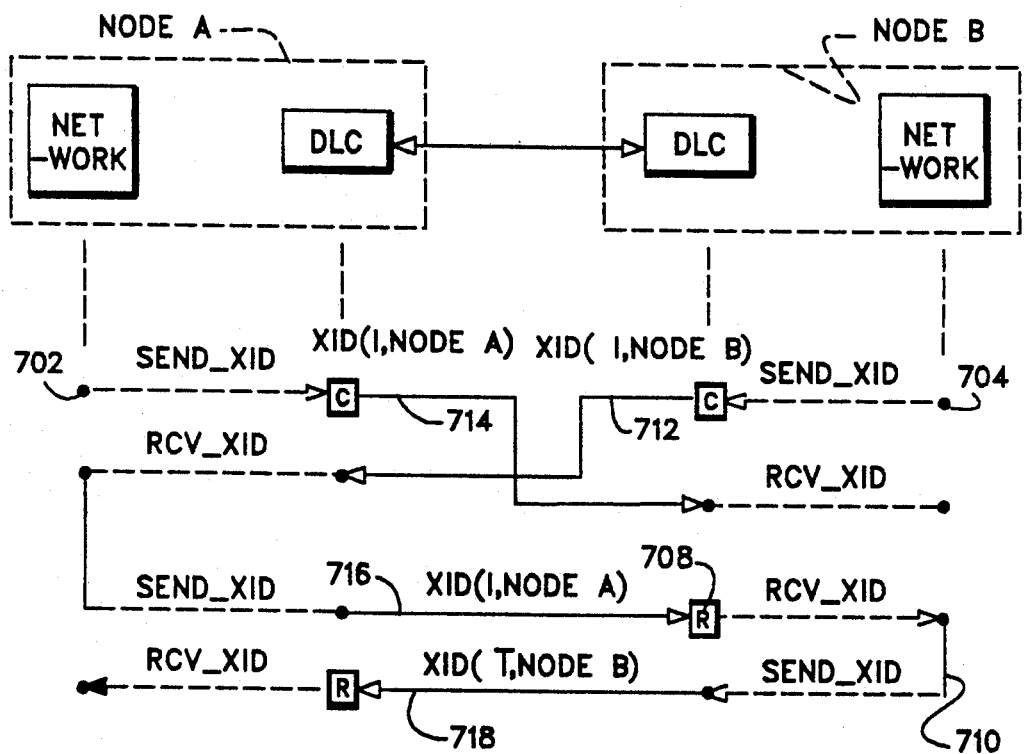
FIG. 7 shows a message flow diagram involving a nonactivation XID message exchange sequence that illustrates how the protocol nonsynchroniztion problem of FIG. 1 is solved by the invention when independent nonactivation XID origination messages cross on the link between two nodes.
Figure 8:
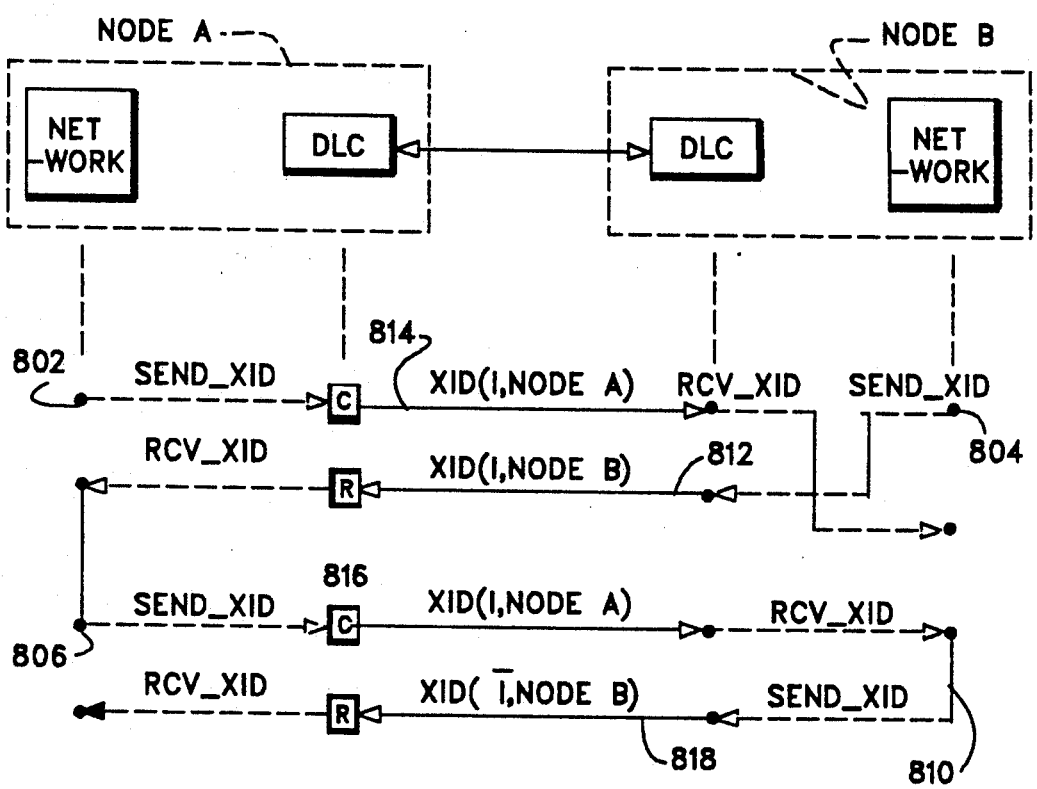
FIG. 8 shows a message flow diagram involving a nonactivation XID message exchange sequence that illustrates how the protocol nonsynchronization problem of FIG. 1 is solved by the invention when independent nonactivation XID origination messages cross between the lower and upper layers of one node.
Figure 9:
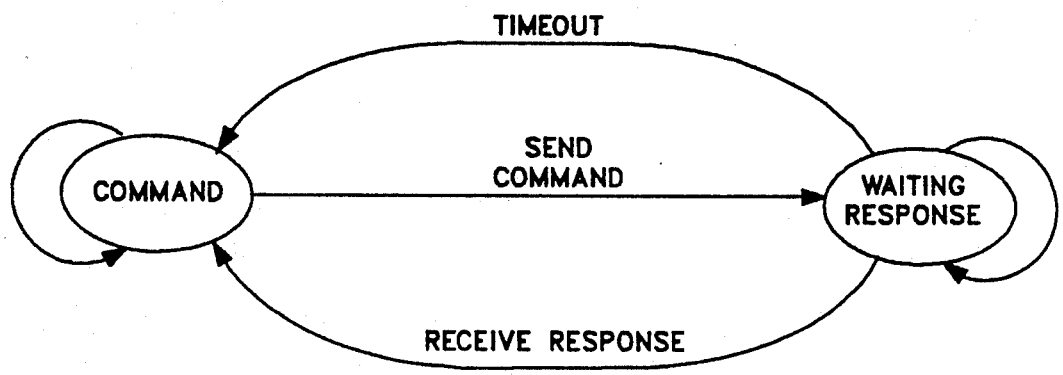
FIGS. 9 and 10 show the state diagrams of the lower layer message send and receive processes that operate according to the IEEE 802.2 protocol standard, as an aid to understanding the invention.
Figure 10:
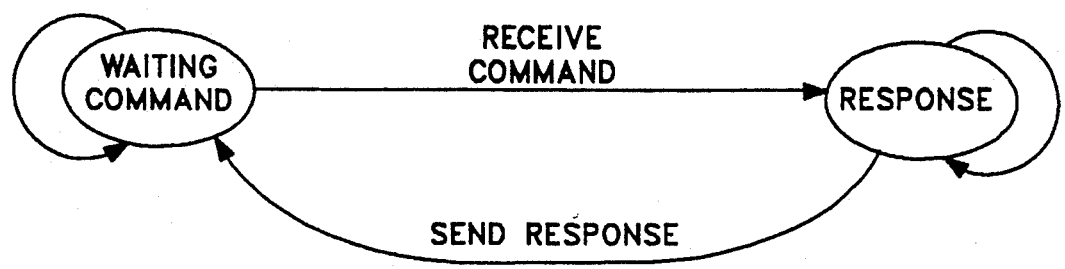

The above steps executed in the network layer of both nodes solve the synchronization problem mentioned earlier, as illustrated by the flow diagrams of FIGS. 7 and 8. In FIG. 7, it is assumed that the network layers at both nodes A and B simultaneously initiate nonactivation XID messages at 702 and 704, respectively. Both of these messages have the INIT field set on, as indicated by the 'I' in the parameter list of each message. As shown in the FIG., it is assumed that the resulting messages (712 and 714) cross during transmission on the link between the nodes. It is assumed that node A is the primary node. In response to the message 712 received from node B, step 314 of FIG. 3 in the network layer of node A detects a synchronization problem and begins the execution of address C (FIG. 6). The same result occurs in node B in response to the receipt of the message 714 from node A. Node A determines that it is the primary at step 602. Node B determines that it is the secondary at the same step. Node A reinitiates the nonactivation XID message 716 with the INIT field set on at step 604. The network layer of Node B discards the originally received nonactivation XID message 714 from node A and waits at step 614 for another XID message from node A. This sequence of actions resynchronizes the protocol flow between the layers of each node. At the same time, the protocol flow between the nodes at the DLC layers is automatically resolved by the action of the network layers and the rules of the DLC layers. Both of the original XID messages 702 and 704 from the network layers of nodes A and B are sent by their respective DLC layers as commands 712 and 714 and are marked as such. On receipt of each message by the other node, the receiving DLC notes that the message is marked as a command and thus enters a state in which the next message it sends to the other node will be marked as a response. Thus, the reinitiated message 716 from the network layer of node A is transmitted by the DLC at node A as a response to the original XID message 712. The XID 710 from the network layer at node B is automatically sent by the network layer to satisfy the protocol exchange and is sent to node A by the node B DLC as a response 718. This satisfies the DLC protocol rules of both nodes. The DLC at node B sent a command 712 and received a response 716. The DLC at node A sent a command 714 and received a response 718. The primary node network layer now controls the XID exchange and may complete its protocol without danger of leaving the DLC protocol unresolved.

FIG. 8 shows another example in which simultaneous nonactivation XID messages from the network layers cross. However, this time the messages do not cross on the link between the nodes, but rather between the DLC layer and the network layer of node B. It is again assumed that node A is the primary node. In response to the message 812 received from node B, step 314 of FIG. 3 in the network layer of node A detects a synchronization problem and begins the execution of address C (FIG. 6). The same result occurs in node B due to the receipt of the message 814 from node A. Node A determines that it is the primary at step 602. Node B determines that it is the secondary at the same step. Node A reinitiates the nonactivation XID message 806 with the INIT field set on at step 604. The network layer of Node B discards the originally received nonactivation XID message 814 from node A and waits at step 614 for another XID message from node A. This sequence of actions resynchronizes the protocol flow between the layers of each node. Again, the protocol flow between the nodes at the DLC layers is automatically resolved. The original XID message 802 from the network layer of node A is sent by its DLC layer as command 814 and is marked as such. Because message 814 crosses the XID message 804 before 804 reaches the DLC at node B, the corresponding message 812 on the link is sent by the DLC at node B as a response to command 814. The resynchronization between the DLC layers is reestablished at this point and the remaining messages on the link are sent in proper command/response protocol. The DLC at node A sends a command 814 and receives a response 812, followed by another command 816 and a response 818.

The final case of nonsynchronization occurs with the crossing of XID messages between the network and DLC layers of the primary node. An analysis similar to the above involving the crossing in the secondary node shows that the protocols also resolve in this case, It is to be understood that the above described arrangements are merely illustrative of the application of principles of the invention and that other arrangements may be devised by workers skilled in the art without departing from the spirit and scope of the invention.

We claim:

1. In a system arranged for providing communication services between first and second nodes by means of a layered communication architecture within the nodes, a method of cynchronizing protocol message operations between the nodes at the lower node layers with protocol operations between the lower and upper layers of each of the nodes, wherein each lower layer has independent processes for sending and receiving messages to another node, a send process having a first state responsive to receipt of a command from an upper layer of its respective node for sending a command to the other node; followed by a second state responsive to the receipt of a response to the command or a timeout for returning to the first state, and a receive process having a first state for receiving a command from the other node, followed by a second state for sending a response to the command and thereafter returning to the first state, the method comprising the steps of sending a first message from the upper layer of the first node to the send process of the first node and setting an initiator flag in said first message to an ON state, in response to the first message by the send process of the first node, transmitting a second message including said initiator flag from the first message to the receive process of the second node, detecting in the upper layer of the first node the receipt of a fourth message from the receive process of the first node corresponding to a third message from the second node, if the initiator flag is ON in the fourth message, determining the primary or secondary status of the first node according to a preestablished criterion, if the first node is primary, resending the first message to the send process of the first node until a message is received from the second node having the initiator flag set to OFF and setting the initiator flag to ON in all subsequent messages to the send process of the first node related to the first message, if the first node is secondary, discarding the fourth message and setting the initiator flag to OFF in all subsequent messages to the send process of the first node related to the first message.

2. The method of claim 1 wherein said first and fourth messages are initial messages generated independently by the first and second nodes, respectively, for changing the parameters of an existing connection between the lower layers of the first and second nodes.

3. The method of claim 1 and claim 2 wherein the lower layer of each node is the data link control layer of the respective node and the upper layer is any other layer of the communication architecture receiving messages from the lower layer.

4. In a system arranged for providing communication services between first and second nodes connected by a link, said services being provided by a layered communication architecture within each node including at least a lower layer and an upper layer, a method performed in the upper layer of each node for synchronizing protocol message operations between the nodes at the lower node layers with protocol operations between the lower and upper layers of each of the nodes, wherein the upper layer of a node sends messages for transmittal to another node to the lower layer of its node and receives messages from another node via the lower layer of its node, and wherein each lower layer has independent processes for sending and receiving messages to another node, the sending process sending a message as a command and then waiting for a response and the receiving process waiting for a command and then sending its next message as a response, the method performed in the first node, comprising the steps of sending an initial message to the second node to change the communication parameters of the link connecting the two nodes, setting an initiator flag in the initial message to an ON state, detecting a second message from the second node also requesting a change in the communication parameters of the link and detecting an ON state of the initiator flag in the second message, responsive to the detection of the second message having the initiator flag set to the ON state, determining the primary or secondary status of the first node, if the first node is primary, resending the initial message to the second node and setting the initiator flag to an ON state in all subsequent messages to the second node related to the change in link parameters, and if the first node is secondary, omitting the resending of the initial message and setting the initiator flag to an OFF state in all subsequent messages related to the request to change the link parameters.

5. In a system arranged for providing communication services between first and second nodes connected by a link, said services being provided by a layered communication architecture within each node including at least a lower layer and an upper layer, a method performed in the upper layer of each node for synchronizing protocol message operations between the nodes at the lower node layers with protocol operations between the lower and upper layers of each of the nodes, wherein the upper layer of a node sends messages for transmittal to another node to the lower layer of its node and receives messages from another node via the lower layer of its node, and wherein each lower layer has independent processes for sending and receiving messages to another node, the sending process sending a message as a command and then waiting for a response and the receiving process waiting for a command and then sending its next message as a response, the method performed in the first node comprising the steps of sending an initial message to the second node, setting an initiator flag in the initial message to an ON state, detecting a second message from the second node, detecting an ON state of the initiator flag in the second message, responsive to the detection of the second message having the initiator flag set to the ON state, determining the primary or secondary status of the first node, if the first node is primary, resending the initial message and setting the initiator flag to an ON state in all subsequent messages to the second node related to the first message, and if the first node is secondary, omitting the resending of the initial message and setting the initiator flag to an OFF state in all subsequent messages related to the first message.

6. In a system arranged for providing communication services between first and second nodes by means of a layered communication architecture within the nodes, apparatus for synchronizing protocol message operations between the nodes at the lower node layers with protocol operations between the lower and upper layers of each of the nodes, wherein each lower layer has independent processes for sending and receiving messages to another node, a send process having a first state responsive to receipt of a command from an upper layer of its respective node for sending a command to the other node; followed by a second state responsive to the receipt of a response to the command or a timeout for returning to the first state, and a receive process having a first state for receiving a command from the other node, followed by a second state for sending a response to the command and thereafter returning to the first state, the apparatus comprising means for sending a first message from the upper layer of the first node to the send process of the first node and including means for setting an initiator flag in said first message to an ON state, the send process of the first node transmitting a second message including said initiator flag from the first message to the receive process of the second node, means in the upper layer of the first node for detecting the receipt of a fourth message from the receive process of the first node corresponding to a third message from the second node, means in the upper layer of the first node responsive to an ON state of the initiator flag in the fourth message for determining a primary or secondary status of the first node, means responsive to a primary status for resending the first message to the send process of the first node until a message is received from the second node having the initiator flag set to OFF and for setting the initiator flag to ON in all subsequent messages to the send process of the first node related to the first message, and means responsive to a secondary status for discarding the fourth message and for setting the initiator flag to OFF in all subsequent messages to the send process of the first node related to the first message.

7. In a system arranged for providing communication services between first and second nodes connected by a link, said services being provided by a layered communication architecture within each node including at least a lower layer and an upper layer, apparatus in the upper layer of each node for synchronizing protocol message operations between the nodes at the lower node layers with protocol operations between the lower and upper layers of each of the nodes, wherein the upper layer of a node sends messages for transmittal to another node to the lower layer of its node and receives messages from another node via the lower layer of its node, and wherein each lower layer has independent processes for sending and receiving messages to another node, the sending process sending a message as a command and then waiting for a response and the receiving process waiting for a command and then sending its next message as a response, the apparatus in the first node comprising means for sending an initial message to the second node to change the communication parameters of the link connecting the two nodes, means for setting an initiator flag in the initial message to an ON state, means for detecting a second message from the second node also requesting a change in the communication parameters of the link, including means for detecting an ON state of the initiator flag in the second message, means responsive to the detecting means and to a primary status of the first node for resending the initial message and for setting the initiator flag to an ON state in all subsequent messages related to the change in link parameters, and means responsive to a secondary status of the first node for setting the initiator flag to an OFF state in all subsequent messages related to the request to change the link parameters.

8. In a system arranged for providing communication services between first and second nodes connected by a link, said services being provided by a layered communication architecture within each node including at least a lower layer and an upper layer, apparatus in the upper layer of each node for synchronizing protocol message operations between the nodes at the lower node layers with protocol operations between the lower and upper layers of each of the nodes, wherein the upper layer of a node sends message for transmittal to another node to the lower layer of its node and receives messages from another node via the lower layer of its node, and wherein each lower layer has independent processes for sending and receiving messages to another node, the sending process sending a message as a command and then waiting for a response and the receiving process waiting for a command and then sending its next message as a response, the apparatus in the first node comprising means for sending an initial message to the second node, means for setting an initiator flag in the initial message to an ON state, means for detecting a second message from the second node, including means for detecting an ON state of the initiator flag in the second message, means responsive to the detecting means and to a primary status of the first node for resending the initial message and for setting the initiator flag to an ON state in all subsequent messages to the second node related to the first message, and means responsive to a secondary status of the first node for setting the initiator flag to an OFF state in all subsequent messages related to the first message.

* * * * *